(12) United States Patent
Bohling et al.

(10) Patent No.: US 10,563,059 B2
(45) Date of Patent: Feb. 18, 2020

(54) LATEX FUNCTIONALIZED WITH STRUCTURAL UNITS OF AN ARGININE FUNCTIONALIZED MONOMER

(71) Applicant: Rohm and Haas Company, Collegeville, PA (US)

(72) Inventors: James C. Bohling, Lansdale, PA (US); Arnold S. Brownell, Lansdale, PA (US); Muhunthan Sathiosatham, Chalfont, PA (US)

(73) Assignee: Rohm and Haas Company, Collegeville, PA (US)

( * ) Notice: Subject to any disclaimer, the term of this patent is extended or adjusted under 35 U.S.C. 154(b) by 240 days.

(21) Appl. No.: 15/840,145

(22) Filed: Dec. 13, 2017

(65) Prior Publication Data

US 2018/0171132 A1 Jun. 21, 2018

Related U.S. Application Data

(60) Provisional application No. 62/436,575, filed on Dec. 20, 2016.

(51) Int. Cl.
| | | |
|---|---|---|
| *C08K 3/22* | (2006.01) | |
| *C09D 151/00* | (2006.01) | |
| *C08F 265/06* | (2006.01) | |
| *C08L 51/00* | (2006.01) | |
| *C09D 5/00* | (2006.01) | |

(52) U.S. Cl.
CPC .......... *C08L 51/003* (2013.01); *C08F 265/06* (2013.01); *C08K 3/22* (2013.01); *C09D 5/00* (2013.01); *C09D 151/003* (2013.01); *C08K 2003/2241* (2013.01); *C08L 2201/50* (2013.01); *C08L 2207/53* (2013.01)

(58) Field of Classification Search
CPC .. C09D 133/14; C09D 133/24; C09D 151/00; C09D 151/003–006; C09D 151/06; C08F 20/34–36; C08F 20/52–54; C08F 20/58–60; C08F 265/00–10
See application file for complete search history.

(56) References Cited

U.S. PATENT DOCUMENTS

| | | | |
|---|---|---|---|
| 6,703,468 B1 | 3/2004 | Otiai et al. | |
| 2013/0289011 A1* | 10/2013 | Yoshimaru | C08K 5/56 514/188 |
| 2017/0335040 A1 | 11/2017 | Liu et al. | |

FOREIGN PATENT DOCUMENTS

| | | |
|---|---|---|
| JP | 2004059540 A | 2/2004 |
| JP | 3995581 B2 | 10/2007 |
| JP | 2014034546 | 2/2014 |

OTHER PUBLICATIONS

Machine Translation of JP3995581B. Oct. 24, 2007. (Year: 2007).*
Kim et al. Zwitterionic guanidine-based oligomers mimicking cell-penetrating peptides as a nontoxic alternative to cationic polymers to enhance the cellular uptake of micelles. Biomacromolecules, 2012, 13, 3418-3426. (Year: 2012).*
Search report from corresponding European 17205306.8 application, dated May 4, 2018.

* cited by examiner

*Primary Examiner* — Stephen E Rieth
(74) *Attorney, Agent, or Firm* — Reid S. Willis

(57) ABSTRACT

The present invention relates to a composition comprising a stable aqueous dispersion of polymer particles comprising structural units of a polymerizable amino acid and structural units of an acid monomer or a salt thereof. The composition of the present invention is useful in improving lipstick stain resistance in coatings compositions.

10 Claims, No Drawings

LATEX FUNCTIONALIZED WITH STRUCTURAL UNITS OF AN ARGININE FUNCTIONALIZED MONOMER

BACKGROUND OF THE INVENTION

The present invention relates to a composition comprising a stable aqueous dispersion of polymer particles (i.e., a latex) functionalized with structural units of an arginine functionalized monomer. The composition of the present invention is useful in coating formulations.

Exceptional stain resistance and/or stain blocking of coatings formulated with coatings-grade emulsion polymers is a continuing challenge for formulators, in part because it is often difficult to balance improvements in stain resistance with a concomitant adverse impact on other paint performance properties. To add to the complexity of the problem, an improvement in hydrophobic stain resistance often correlates with a detriment to hydrophilic stain resistance.

For example, it is known that using concentrations of sodium lauryl sulfate surfactant exceeding 2 weight percent can have a positive impact on many hydrophobic stains, but can also compromise water resistance and hydrophilic stain resistance, as well as exacerbate surfactant leeching and water spotting.

Incorporating phosphoethyl methacrylate (PEM) into binders in coatings formulations can greatly improve resistance to hydrophilic stains (coffee, in particular); nevertheless, PEM is known to exacerbate grit formation during the paint making process. Additionally, PEM-containing polymers often exhibit limited compatibility in the presence of certain formulation raw materials (such as certain types of attapulgite or bentonite clays).

Ethyl acrylate (EA) functionalized polymer particles are particularly resistant to lipstick stains, but concentrations of EA exceeding 20% of the total latex particle composition are often required to see this effect, thereby limiting other monomer choices. Moreover, EA has a very low odor threshold, therefore requiring extensive and sometimes costly chasing of residual monomer.

Additionally, many of the acid monomers or adjuncts that are used to achieve colloidal stability, such as surfactants and persulfates, can have a negative impact on stain resistance. Accordingly, it would be an advance in the art of stain resistance to find a way to strike a better balance between stain resistance and other performance properties.

SUMMARY OF THE INVENTION

The present invention addresses a need in the art by providing a composition comprising an aqueous dispersion of polymer particles comprising from 0.02 to 4 weight percent structural units of an acid monomer or a salt thereof; and from 0.05 to 3 weight percent structural units of an arginine functionalized monomer characterized by the following structure:

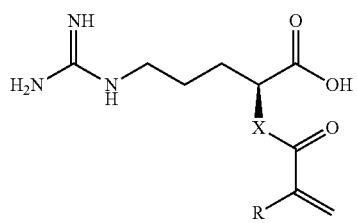

wherein X is NH, NHCH$_2$CH$_2$O, NHCH$_2$CH$_2$NR or NHCH$_2$CH(OH)CH$_2$O; and each R is independently H or CH$_3$.

The composition of the present invention is particularly effective in improving lipstick stain resistance of a paint.

DETAILED DESCRIPTION OF THE INVENTION

The present invention is a composition comprising an aqueous dispersion of polymer particles comprising from 0.02 to 4 weight percent structural units of an acid monomer or a salt thereof; and from 0.05 to 3 weight percent structural units of an arginine functionalized monomer characterized by the following structure:

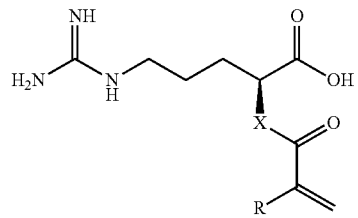

wherein X is NH, NHCH$_2$CH$_2$O, NHCH$_2$CH$_2$NR or NHCH$_2$CH(OH)CH$_2$O; and each R is independently H or CH$_3$.

Preferably, X is NH and R is CH$_3$.

As used herein, the term "aqueous dispersion of polymer particles" is synonymous with the word "latex."

As used herein, the term "structural unit" refers to the remnant of a monomer after polymerization. For example, a structural unit of N$^2$-arginine methacrylate is illustrated as follows:

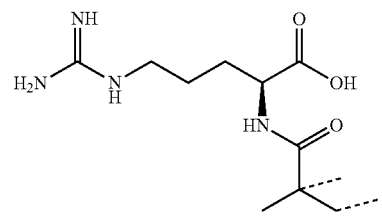

Structural Unit of N$^2$-arginine methacrylate where the dotted lines represent the points of attachment to the polymer backbone. Preferably, the concentration of structural units of the arginine functionalized methacrylate in the polymer particles, preferably N$^2$-arginine methacrylate in the polymer particles, is from 0.1, more preferably from 0.2, and most preferably from 0.25 weight percent, to 2, more preferably to 1 and most preferably to 0.75 weight percent based on the weight of the polymer particles. It is understood that structural units of the arginine functionalized monomer include salts and zwitterions thereof.

N$^2$-Arginine methacrylate can be conveniently prepared by contacting arginine with methacrylic anhydride at room temperature.

Other examples of arginine functionalized methacrylates include N$^2$-(2-hydroxy-3-(methacryloyloxy)propyl-arginine, which can be prepared by the reaction of N$^2$-arginine and glycidyl methacrylate:

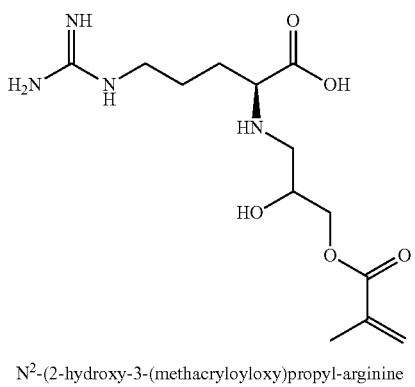 [SMILES: C=C(C)C(=O)OCC(O)CN[C@@H](CCCNC(=N)N)C(=O)O]

N²-(2-hydroxy-3-(methacryloyloxy)propyl-arginine and N²-(2-(methacryloyloxy)ethyl)-arginine, which can be conveniently prepared by condensation of arginine and 2-hydroxyethyl methacrylate.

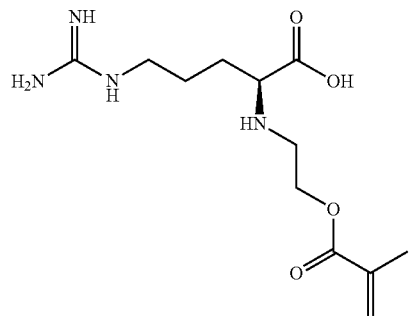

N²-(2-(methacryloyloxy)ethyl)-arginine

As used herein, the term "acid monomer" is an ethylenically unsaturated monomer that contains an ionizable proton. Suitable classes of acid monomers include carboxylic acid, sulfur acid, phosphorus acid monomers. Examples of carboxylic acid monomers and salts thereof include acrylic acid, methacrylic acid, and itaconic acid and salts thereof; examples of suitable sulfur acid monomers include sulfoethyl methacrylate, sulfopropyl methacrylate, styrene sulfonic acid, vinyl sulfonic acid, and 2-acrylamido-2-methyl propanesulfonic acid, and salts thereof.

Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates. PEM, which is an especially preferred phosphorus acid monomer, is represented by the following structure:

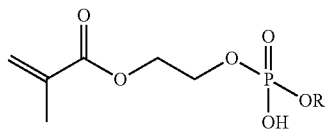

where R is H or

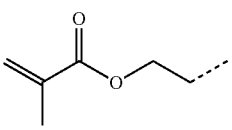

Preferably, the concentration of structural units of the acid monomer is in the range of from 0.05, more preferably from 0.1 and most preferably from 0.3 weight percent, to preferably 6, more preferably to 4, and more preferably to 2 weight percent, based on the weight of the polymer particles. The acid monomer may also be a combination of acid monomers, for example, a phosphorus acid monomer, preferably at a concentration in the range of from 0.1, more preferably from 0.2 and most preferably from 0.5 weight percent, to preferably 5, more preferably to 3, and most preferably to 2 weight percent, based on the weight of the polymer particles; and a carboxylic acid monomer preferably at a concentration in the range of from 0.1, more preferably from 0.2 and most preferably from 0.5 weight percent; to preferably 4, more preferably 2.5 weight percent, based on the weight of the polymer particles.

The polymer particles are preferably acrylic-based polymer particles. As used herein, the term "acrylic-based polymer particles" refers to polymer particles (including seed polymer particles) that comprise at least 25 weight percent, based on the weight of the polymer particles, of structural units of methacrylate or acrylate monomers or a combination thereof. Preferably, the acrylic based polymer particles comprise from 50, more preferably from 80, and most preferably from 90, to 99.9, more preferably to 98, and most preferably to 96 weight percent structural units of acrylate or methacrylate monomers or a combination thereof. Preferably, the polymer particles comprise one or more methacrylate monomers such as methyl methacrylate, ethyl methacrylate, or butyl methacrylate; and b) one or more acrylate monomers such as ethyl acrylate, butyl acrylate, 2-propylheptyl acrylate, or 2-ethylhexyl acrylate.

The acrylic-based polymer particles may also comprise from 0.1 to 0.5 weight percent structural units of a multiethylenically unsaturated monomer such as divinyl benzene or allyl methacrylate, and may also comprise structural units of other monomers such as styrene in the range of from 5 to 50 weight percent based on the weight of the polymer particles and vinyl acetate in the range of from 50 to 75 weight percent based on the weight of the polymer particles.

The morphology of the polymer particles is not critical. The polymer particles may be prepared by way of a single stage or by a multistage polymerization reaction; they may have a spherical morphology or an acorn morphology, whereby a core portion protuberates from a shell portion of the polymer particles; and they may be pigment-adsorbing (e.g., TiO₂-adsorbing) polymer particles, but need not be.

The composition of the present invention further advantageously includes pigments such as TiO₂ and other additives such as defoamers, surfactants, dispersants, rheology modifiers, biocides, and neutralizing agents. It has surprisingly been discovered that coating formed from the composition of the present invention, especially paints, show a marked resistance to lipstick stains without adversely affecting other performance properties of the paint.

EXAMPLES

Comparative Example 1—Preparation of a Bimorphological Adsorbing Latex not Functionalized with $N^2$-Arginine Methacrylate A. Core (Preform) Synthesis.

A first monomer emulsion (ME1) was prepared by mixing deionized water (200 g), Disponil FES 993 surfactant (43 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g). To a 5-L, four necked round bottom flask equipped with a paddle stirrer, a thermometer, nitrogen inlet, and a reflux condenser was added deionized water (600 g) and Disponil FES 32 surfactant (43 g, 30% active). The contents of the flask were heated to 85° C. under $N_2$ and stirring was initiated. A portion of ME1 (70 g) was then added, quickly followed by a solution of sodium persulfate (2.56 g) dissolved in deionized water (30 g) followed by a rinse of deionized water (5 g). After stirring for 10 min, the remainder of ME1, followed by a rinse (25 g), and an initiator solution of sodium persulfate (0.64 g) dissolved in deionized water (50 g) were added linearly and separately over 40 min. After the ME1 feed was complete, the contents of the flask were held at 85° C. for 10 min, after which time the co-feed was completed and the contents of the flask were then held at 85° C. for an additional 10 min. The contents of the flask were cooled to room temperature and neutralized to pH 3 with a dilute solution of ammonium hydroxide. The measured particle size using a Brookhaven BI 90 Plus particle analyzer was 60-75 nm and the solids were 40%.

B. Acorn Core-Shell Synthesis

A second monomer emulsion (ME2) was prepared using deionized water (400 g), sodium dodecylbenzene sulfonate (55.4 g, 23% active), Disponil FES 993 surfactant (48.17 g, 30% active), butyl acrylate (775.2 g), methyl methacrylate (797.33 g), ureido methacrylate (44.2 g, 50% active), acrylic acid (10.2 g), and sodium 4-vinylbenzenesulfonate (11.33 g, 90% active).

To a 5-L, four necked round bottom flask equipped with a paddle stirrer, a thermometer, $N_2$ inlet, and a reflux condenser was added deionized water (850 g) and Disponil FES 993 surfactant (5.65 g, 30% active). The contents of the flask were heated to 84° C. under $N_2$ and stirring was initiated. A portion of ME2 (75 g, 3.5% of total monomer) was then added, quickly followed by an aqueous solution of ammonium persulfate (5.1 g) dissolved in deionized water (25 g), followed by a rinse of deionized water (5 g). After stirring for 10 min, a portion of the pre-form from Step A was then added (212.5 g 5.0% of total monomer), followed by addition of the remainder of ME2 and then a solution containing ammonium persulfate (1.7 g) and ammonium hydroxide (5 g, 29% active) dissolved in deionized water (55 g), each added linearly and separately to the flask over a total period of 80 min. The contents of the flask were maintained at a temperature of 84° C. during the addition of the second monomer emulsion. When all additions were complete, the vessel containing the second monomer emulsion was rinsed with deionized water (25 g), which was then added to the flask.

The contents of the flask were cooled to 65° C. and a catalyst/activator pair was added to the flask to reduce residual monomer. TERGITOL™ 15-S-40 surfactant (A Trademark of The Dow Chemical Company or its Affiliates, 12.15 g, 70% solids) was added. The polymer was then neutralized to pH 9 with a dilute ammonium hydroxide solution. The measured particle size using a Brookhaven BI 90 Plus particle analyzer was 122 nm and the solids were 49.5%.

Comparative Example 2—Preparation of a 2-Stage Spherical Adsorbing Latex not Functionalized with $N^2$-Arginine Methacrylate ME1 was prepared by mixing deionized water (200 g), Disponil FES 993 surfactant (34 g, 30% active), butyl acrylate (309.4 g), methyl methacrylate (252.62 g), phosphoethyl methacrylate (30.6 g, 60% active), and sodium 4-vinylbenzenesulfonate (2.64 g, 90% active).

ME2 was prepared using deionized water (300 g), Disponil FES 32 surfactant (28.33 g, 30% active), butyl acrylate (574.6 g), methyl methacrylate (449.48 g), ureido methacrylate (51 g, 50% active), acetoacetoxyethyl methacrylate (53.68 g, 95% active) and sodium 4-vinylbenzenesulfonate (4.92 g, 90% active).

To a 5-L, four necked round bottom flask equipped with a paddle stirrer, a thermometer, $N_2$ inlet, and a reflux condenser was added deionized water (900 g) and Disponil FES 32 surfactant (5.65 g, 30% active). The contents of the flask were heated to 85° C. under $N_2$ and stirring was initiated. A portion of ME1 (105 g) was then added, quickly followed by an aqueous solution of ammonium persulfate (5.1 g) dissolved in deionized water (25 g), followed by a rinse of deionized water (5 g). After stirring for 10 min, the remainder of ME1 and a solution containing ammonium persulfate (0.67 g) dissolved in deionized water (30 g), were added linearly and separately to the flask over a total period of 45 min. After the completion of the addition of ME1, the vessel containing ME1 was rinsed with deionized water (25 g), which was then added to the flask, and the contents of the flask were maintained at a temperature of 85° C. for 15 min. ME2 and a solution containing ammonium persulfate (1.03 g) dissolved in deionized water (50 g), were added linearly and separately to the flask over a total period of 70 min. After 20 min into the addition of ME2, a solution containing ammonium hydroxide (10 g, 29% active) dissolved in deionized water (20 g) was added linearly and separately to the flask concurrent with the addition of ME2. When all additions were complete, the vessel containing ME2 was rinsed with deionized water (25 g), which was then added to the flask.

The contents of the flask were cooled to 70° C. and a catalyst/activator pair was added to the flask to reduce residual monomer. The polymer was then neutralized to pH 9.3 with a dilute ammonium hydroxide solution. The measured particle size using a Brookhaven BI 90 Plus particle analyzer was 109 nm and the solids were 48.0%.

Comparative Example 3—Preparation of a Spherical Non-Adsorbing Latex not Functionalized with $N^2$-Arginine Methacrylate A monomer emulsion was prepared by mixing deionized water (800 g), sodium lauryl sulfate (16.59 g, 28% active), butyl acrylate (957.95 g), methyl methacrylate (977.53 g), and methacrylic acid (19.52 g).

To a 5-L, four necked round bottom flask equipped with a paddle stirrer, a thermometer, $N_2$ inlet, and a reflux condenser was added deionized water (700 g), sodium lauryl sulfate (19.73 g, 28% active), and a solution of sodium carbonate (6.8 g) dissolved in deionized water (67 g). The contents of the flask were heated to 88° C. under $N_2$ and stirring was initiated. A portion of the monomer emulsion (59 g) was then added, quickly followed by an aqueous solution of ammonium persulfate (6.8 g) dissolved in deionized water (25 g) followed by a rinse of deionized water (5 g). After stirring for 10 min, the remainder of the monomer emulsion and a solution containing ammonium persulfate (1.04 g) dissolved in deionized water (99 g), were added separately to the flask over a total period of 65 min. After the completion of the addition of the monomer emulsion, the vessel containing the monomer emulsion was rinsed with deionized water (25 g), which was then added to the flask, and the contents of the flask were maintained at a temperature of 88° C. for 5 min.

The contents of the flask were cooled to 75° C. and a catalyst/activator pair was added to the flask to reduce residual monomer. The polymer was then neutralized to pH 8.5 with a dilute ammonium hydroxide solution. The measured particle size using a Brookhaven BI 90 Plus particle analyzer was 140 nm and the solids were 50.6%.

Example 1—Preparation of a Bimorphological Adsorbing Latex Functionalized with $N^2$-Arginine Methacrylate The latex was prepared substantially as described in Comparative Example 1 except that, in part B, the amount of methyl methacrylate was reduced by 17 g to 780.33 g and $N^2$-arginine methacrylate (42.5 g, 40% active) was added to the ME2 mixture. The measured particle size using a Brookhaven BI 90 Plus particle analyzer was 128 nm and the solids were 49.2%.

Example 2—Preparation of a 2-Stage Spherical Adsorbing Latex Functionalized with $N^2$-Arginine Methacrylate The latex was prepared substantially as described in Comparative Example 2 except that the amount of methyl methacrylate was reduced by 8.5 g to 440.98 g in ME2 and $N^2$-arginine methacrylate (21.2 g, 40% active) was added to the ME2 mixture. The measured particle size using a Brookhaven BI 90 Plus particle analyzer was 106 nm and the solids were 48.4%.

Example 3—Preparation of a Spherical Non-Adsorbing Latex Functionalized with $N^2$-Arginine Methacrylate The latex was prepared substantially as described in Comparative Example 3 except that the amount of methyl methacrylate in the monomer mixture was reduced by 9.8 g to 967.73 g and $N^2$ arginine methacrylate (24.5 g, 40% active) was added to the monomer emulsion mixture. The measured particle size using a Brookhaven BI 90 Plus particle analyzer was 131 nm and the solids were 50.6%.

Table 1 shows the materials and steps used to prepare the paint formulations that were subjected to lipstick stain resistant testing. Binder refers to latexes prepared from Examples 1 and 2 and Comparative Examples 1 and 2. Ultra refers to ROPAQUE™ Ultra Opaque Polymer; Kronos 4311 refers to Kronos 4311 $TiO_2$ slurry; Tamol 2011 refers to TAMOL™ 2011 Dispersant; Tergitol 15-S-40 refers to TERGITOL™ 15-S-40 Surfactant; ASP 170 refers to ASP 170 Kaolin Clay; Minex 10 refers to Minex 10 Nepheline Syenite; Attagel 50 refers to Attagel 50 extender; Optifilm 400 refers to Optifilm 400 Coalescent. ROPAQUE, TAMOL, and TERGITOL are all Trademarks of The Dow Chemical Company or its Affiliates.

TABLE 1

Paint Formulations Using Examples 1 and 2 and Comparative Examples 1 and 2

|  | lbs | gal |
|---|---|---|
| Premix |  |  |
| Binder | 540.80 | 61.14 |
| Ultra | 21.37 | 2.50 |
| Defoamer | 1.00 | 0.12 |
| Kronos 4311 | 299.57 | 15.36 |
| Grind |  |  |
| Kronos 4311 | 49.93 | 2.56 |
| Water | 16.12 | 1.93 |
| Tamol 2011 | 11.28 | 1.24 |
| Defoamer | 1.00 | 0.12 |
| Tergitol 15-S-40 | 0.22 |  |
| Ammonia (28% aq) | 1.00 | 0.13 |
| Place grind pot on Cowles and add the following: |  |  |
| ASP 170 | 20.00 | 0.93 |
| Minex 10 | 20.00 | 0.92 |
| Disperse for 25 min at 1500 rpm, then add: |  |  |
| Attagel 50 | 3.00 | 0.15 |
| Add grind into Premix then continue |  |  |
| Coalescent | 15.00 | 1.87 |
| Optifilm 400 | 3.99 | 0.50 |
| Tergitol 15-S-40 | 2.00 | 0.22 |
| Water | 74.19 | 8.89 |
| HEUR ICI builder | 10.34 | 1.19 |
| Adjust KU to 90-100, ICI to 1 to 1.2, pH to 9.0 to 9.2 |  |  |
| Totals | 1092.59 | 100.00 |

Table 3 shows the materials and steps used to prepare another paint formulation that was subjected to lipstick stain resistant testing. Binder refers to latexes prepared from Example 3 and Comparative Example 3.

TABLE 2

Paint Formulations Including Binders from Example 3 and Comparative Example 3

|  | lbs | gal |
|---|---|---|
| Grind |  |  |
| Water | 40.00 | 4.79 |
| Byk-022 | 1.00 | 0.12 |
| Surfonyl CT-111 | 3.28 | 0.41 |
| Tamol 2011 | 8.76 | 0.96 |
| Ti-Pure R-746 | 314.25 | 16.17 |
| Letdown |  |  |
| Binder 3 | 538.88 | 60.69 |
| Tamol 2011 | 11.28 | 1.24 |
| BYK-024 | 4.99 | 0.59 |
| Texanol | 27.27 | 3.44 |
| Add grind and adjust pH to 8.6 |  |  |
| RM-2020 | 26.22 | 3.01 |
| RM-8W | 2.70 | 0.31 |

TABLE 2-continued

Paint Formulations Including Binders from Example 3 and Comparative Example 3

| | lbs | gal |
|---|---|---|
| Water | 79.00 | 9.46 |
| Adjust KU to 95-100, ICI to 1 to 1.2, pH to ~8.6 | | |
| Totals | 1046.34 | 99.97 |

Table 3 compares particles sizes and pH values of the examples and comparative intermediate examples; PS refers to average particle size of the polymer particles.

TABLE 3

Particle Size and pH Comparisons

| Example No. | PS (nm) | pH |
|---|---|---|
| 1 | 128 | 9.3 |
| Comp. 1 | 122 | 9.0 |
| 2 | 106 | 9.3 |
| Comp. 2 | 109 | 9.4 |
| 3 | 131 | 8.5 |
| Comp. 3 | 140 | 8.5 |

The results suggest no apparent deleterious impact on colloidal stability and no loss of particle size control resulting from the inclusion of $N^2$-arginine methacrylate functionality into the polymer particles.

Procedure for Stain Testing (Adapted from ASTM Method D4828)

The test paint was cast on a black vinyl chart with 7-mil (wet) Dow applicator, and a control paint was cast adjacent to the test paint. The paints were dried at 77° F. (25° C.) at 50% relative humidity for seven days. One-half inch sections were marked across the test panel and lipstick was applied uniformly to fill in the test area. The stains were allowed to soak in for about 2 h. A 3"×4" sponge was soaked in tap water and squeezed out until no more water dripped from the sponge. The sponge was then attached to a 1-kg abrasion boat and 10 mL of thoroughly-mixed Leneta Standardized Non-Abrasive Scrub Medium and 15 mL of tap water were applied to the exposed face of the sponge. The panel was then scrubbed for 100 cycles with the 1-kg boat using a GARDCO Washability & Wear tester. (Model D10 WA-2151). The panel was rinsed thoroughly with water and allowed to dry; the extent of stain removal was rated using a BYK Spectro-guide 45/0 gloss meter to measure the LAB* values of the scrubbed and unscrubbed sides of the panels, and ΔE values were then calculated. Table 4 shows the ΔE values for each of the paints. Paints 1 to 3 refers to paints prepared using latexes from Examples 1 to 3; Paints 1a, 1b, and 1c refer to paints prepared using the latexes from Comparative Examples 1, 2, and 3.

TABLE 4

Lipstick Stain Resistance Results

| Example No. | Solids (%) | ΔE |
|---|---|---|
| Paint 1 | 49.2 | 0.7 |
| Paint 1a | 49.5 | 4.3 |
| Paint 2 | 48.4 | 0.3 |
| Paint 2a | 48.0 | 8.2 |

TABLE 4-continued

Lipstick Stain Resistance Results

| Example No. | Solids (%) | ΔE |
|---|---|---|
| Paint 3 | 50.6 | 0.3 |
| Paint 3a | 50.6 | 3.7 |

The results show a dramatic improvement in lipstick stain resistance for the paints containing binder functionalized with $N^2$-arginine methacrylate. It has also been discovered that other performance properties of the paints such as paint viscosity stability, hiding, scrub resistance, and block resistance were not adversely affected by the inclusion of such relatively low concentrations of $N^2$-arginine methacrylate.

The invention claimed is:

1. A composition comprising an aqueous dispersion of polymer particles comprising from 0.02 to 4 weight percent structural units of an acid monomer or a salt thereof; and from 0.05 to 3 weight percent structural units of an arginine functionalized monomer characterized by the following structure:

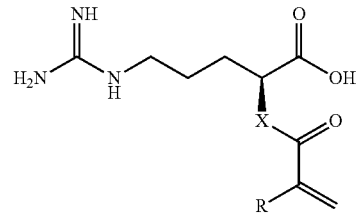

wherein X is NH, NHCH$_2$CH$_2$O, NHCH$_2$CH$_2$NR or NHCH$_2$CH(OH)CH$_2$O; and each R is independently H or CH$_3$.

2. The composition of claim 1 wherein the arginine functionalized monomer is $N^2$-arginine methacrylate.

3. The composition of claim 2 wherein the polymer particles comprise from 0.1 to 4 weight percent structural units of a carboxylic acid monomer or a salt thereof, based on the weight of the polymer particles, and from 0.2 to 2 weight percent structural units of $N^2$-arginine methacrylate, wherein the carboxylic acid monomer is acrylic acid, methacrylic acid, or itaconic acid.

4. The composition of claim 2 wherein the polymer particles comprise from 0.1 to 4 weight percent structural units of a sulfur acid monomer or a salt thereof, based on the weight of the polymer particles, and from 0.2 to 2 weight percent structural units of $N^2$-arginine methacrylate, wherein the sulfur acid monomer is styrene sulfonic acid or 2-acrylamido-2-methyl propanesulfonic acid.

5. The composition of claim 2 wherein the polymer particles comprise from 0.2 to 3 weight percent structural units of phosphoethyl methacrylate or a salt thereof, based on the weight of polymer particles.

6. The composition of claim 2 wherein the polymer particles comprise 0.1 to 4 weight percent structural units of an acid monomer or a salt thereof, wherein the acid monomer is a) a carboxylic acid monomer and a sulfur acid monomer; or b) a carboxylic acid monomer and a phosphorus acid monomer; or c) a sulfur acid monomer and a phosphorus acid monomer; or d) a carboxylic acid monomer, a sulfur acid monomer, and a phosphorus acid monomer.

7. The composition of claim 6 wherein the polymer particles comprise 80 to 99.9 weight percent structural units of a methacrylate or an acrylate monomer or a combination thereof.

8. The composition of claim 7 wherein the polymer particles comprise structural units of methyl methacrylate, and one or more acrylates selected from the group consisting of ethyl acrylate, butyl acrylate, 2-propylheptyl acrylate, and 2-ethylhexyl acrylate.

9. The composition of claim 7 wherein the polymer particles are $TiO_2$-adsorbing particles having acorn morphology; or spherical $TiO_2$-adsorbing particles; or $TiO_2$ non-adsorbing polymer particles, or combinations thereof.

10. The composition of claim 1 which further comprises $TiO_2$ and one or more additives selected from the group consisting of defoamers, surfactants, dispersants, rheology modifiers, biocides, and neutralizing agents.

* * * * *